United States Patent [19]
Lechuga

[11] Patent Number: 5,427,417
[45] Date of Patent: Jun. 27, 1995

[54] PROTECTIVE COVER FOR USE WITH DRAIN PIPES

[76] Inventor: Gabriel Lechuga, 67365 Verona Rd., Cathedral City, Calif. 92234

[21] Appl. No.: 245,560

[22] Filed: May 18, 1994

[51] Int. Cl.6 .............................................. F16L 55/07
[52] U.S. Cl. ..................................... 285/46; 405/127; 210/460; 210/153; 52/12; 52/16; 52/101
[58] Field of Search .................. 285/46, 177; 405/127; 210/460, 463, 153; 239/DIG. 23, 590.3; 52/16, 101, 220.1, 220.8, 204.52, 302.7, 12; 139/96 R

[56] References Cited
U.S. PATENT DOCUMENTS

| | | | |
|---|---|---|---|
| 649,744 | 5/1900 | Neal | 285/46 |
| 1,191,497 | 7/1916 | Dauphinee | 210/463 X |
| 1,752,823 | 4/1930 | Walker | 239/590.3 |
| 1,937,732 | 12/1933 | Tverdak | 210/463 X |
| 2,518,205 | 8/1950 | Vinokor | 210/463 X |
| 2,689,017 | 9/1954 | Schmid | 210/460 X |
| 3,674,146 | 7/1972 | Donalson | 210/463 X |
| 3,703,194 | 11/1972 | Giordano | 52/16 X |
| 4,129,503 | 12/1978 | Joseph | 210/460 X |
| 4,244,484 | 1/1981 | Guritz et al. | 52/220.1 X |
| 4,798,028 | 1/1989 | Pinion | 285/177 X |
| 5,114,594 | 5/1992 | Rosebrock et al. | 52/12 X |
| 5,297,299 | 3/1994 | Wilson | 210/463 |

FOREIGN PATENT DOCUMENTS 2027620 12/1971 Germany ............................ 210/153

Primary Examiner—Randolph A. Reese
Assistant Examiner—Heather Chun Shackelford
Attorney, Agent, or Firm—Robert J. Schaap

[57] ABSTRACT

A protective and aesthetics-enhancing cover for disposition over the open end of a drain pipe projecting outwardly from a building structure. The protective cover comprises a convexo-concave disk which has an outer surface convex away from the building structure and an inner surface concave toward the building structure. The convexo-concave disk is sized so as to effectively hide the drain pipe from view. A tubular mounting flange projects from the disk on the concave surface thereof for coupling to the drain pipe in a telescopic arrangement to thereby hold the cover on the end of the drain pipe. An opening is formed in the disk to allow water to drain from the drain pipe and through the opening.

12 Claims, 2 Drawing Sheets

PROTECTIVE COVER FOR USE WITH DRAIN PIPES

BACKGROUND OF THE INVENTION

1. Field of the Invention

This invention relates in general certain useful improvements in a protective and aesthetics-enhancing cover for disposition over the open end of a drain pipe and more particularly, to a protective cover of the type stated which has a disk extending over the end of the drain pipe to effectively hide the drain pipe from view.

2. Brief Description of the Prior Art

It is quite common, particularly in large buildings such as commercial and industrial buildings, to utilize drain pipes, overflow pipes, condensation pipes and the like. Typically, these pipes, which are generically referred to as "drain pipes", usually extend through a wall of the building and outwardly of the wall at some point so as to allow condensed water, overflow rain water, or the like, to drain outwardly from the pipe.

Drain pipes, overflow pipes and condensation pipes, herein referred to as "drain pipes", are frequently used on all types of buildings, including the commercial and industrial buildings, as aforesaid, but also find common use in large residential buildings, such as apartment buildings, and the like. To some extent, though less frequently, these drain pipes, condensation pipes and overflow pipes are used in residential dwelling structures. In all cases, the pipe protrudes outwardly from the wall of a building to allow water to drain through the pipe and is usually unsightly.

In an effort to improve the aesthetics of an open-ended pipe projecting outwardly from a building, some users have resorted to the placement of a collar around the end of the pipe. Theoretically, the collar is used to provide somewhat of a finished look. However, in many cases the collar merely makes the end of the drain pipe more obtrusive and more noticeable.

One of the problems frequently encountered with drain pipes is that they are attractive to rodents such as rats, mice or the like. Furthermore, they are attractive to various insects. Accordingly, there is some need to preclude occupancy of or transit through these pipes by either rodents or insects. However, the pipe must remain open so as to enable the drainage of water when required.

The present invention overcomes these and other problems in the provision of a unique protective cover which extends over the open end of these drain pipes.

OBJECTS OF THE INVENTION

It is, therefore, one of the primary objects of the present invention to provide a protective cover for disposition over the open end of a drain pipe projecting outwardly from a building to enhance the aesthetic appearance of a projecting drain pipe.

It is another object of the present invention to provide a protective cover of the type stated which effectively hides the projecting end of a drain pipe from view.

It is a further object of the present invention to provide a protective cover of the type stated which precludes access by rodents and other small animals and insects.

It is an additional object of the present invention to provide a protective and aesthetics-enhancing cover of the type stated which can be used on all types of drain pipes, including condensation pipes, overflow types, roof drains and the like.

It is another salient object of the present invention to provide a protective cover of the type stated which can be manufactured at a relatively low cost and which is highly reliable in operation.

It is still a further object of the present invention to provide a protective cover of the type stated which is made in different sizes so as to accommodate essentially all sizes of current drain pipes.

With the above and other objects in view, my invention resides in the novel features of form, construction, arrangement and combination of parts and components as presently described and pointed out in the Claims.

BRIEF SUMMARY OF THE INVENTION

A protective and aesthetics-enhancing cover for disposition over the open end of a drain pipe projecting outwardly from a building structure. In this case, the protective cover is adapted for use with a large number of drain pipes, including both condensation pipes and overflow pipes. Moreover, the protective cover is used for disposition over the ends of drain pipes on essentially all types of buildings, including commercial, industrial and residential buildings.

The protective cover of the present invention comprises of a disk, preferably a convexo-concave disk. The disk has an inner surface which is concave toward the wall from which the drain pipe projects, and is concave outwardly away from the wall. Furthermore, the disk is sized to extend over the open end of this drain pipe and effectively hides the drain pipe from view. In this way, the overall aesthetic appearance is thereby improved.

A tubular mounting flange projects from the disk on the concave surface thereof facing the drain pipe. This mounting flange is sized to be coupled to the drain pipe in a type of telescopic arrangement to thereby retentively hold the cover over the open end of the drain pipe. Preferably, the drain pipe projects inwardly of and is concentrically disposed within the tubular mounting flange during this telescopic arrangement.

The disk of the protective cover is provided with an opening which allows water to drain through the drain pipe and outwardly through the opening. However, in a more preferred embodiment, a grid or mesh extends over this opening to allow water to drain through but to also preclude access by small animals, such as rodents and the like, or insects.

A circular retainer flange extends inwardly of the opening to receive the end of the drain pipe. In this way, the end of the drain pipe actually abuts against the circular retaining flange or collar, and thereby further hides the end of the pipe from view. In essence, the opening only has to conform to the opening of the drain pipe. As a result, when one looks through the grid of the opening, they effectively see only a dark space and do not see the end of the drain pipe.

This invention possesses many other advantages and has other purposes which may be made more clearly apparent from a consideration of the forms in which it may be embodied. These forms are shown in the drawings forming a part of and accompanying the present specifications. They will now be described in detail in the following detailed description of this invention for purposes of setting forth the general principles of the invention. However, it is to be understood that the accompanying drawings and the following detailed description are not to be taken in a limiting sense.

BRIEF DESCRIPTION OF THE DRAWINGS

Figure 1:
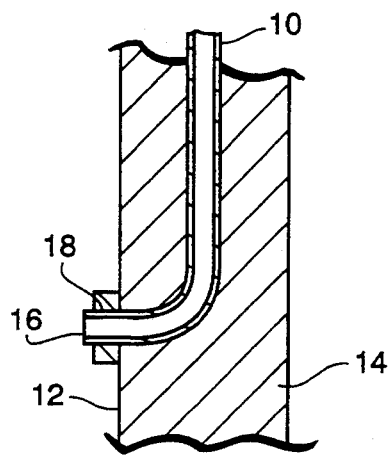
Figure 2:
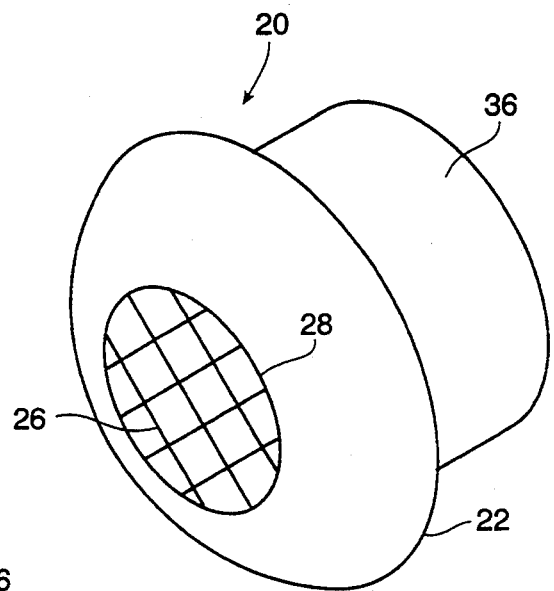
Figure 3:
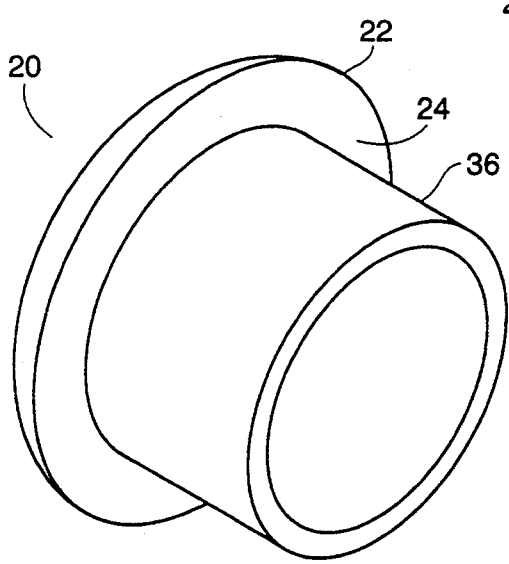
Figure 4:
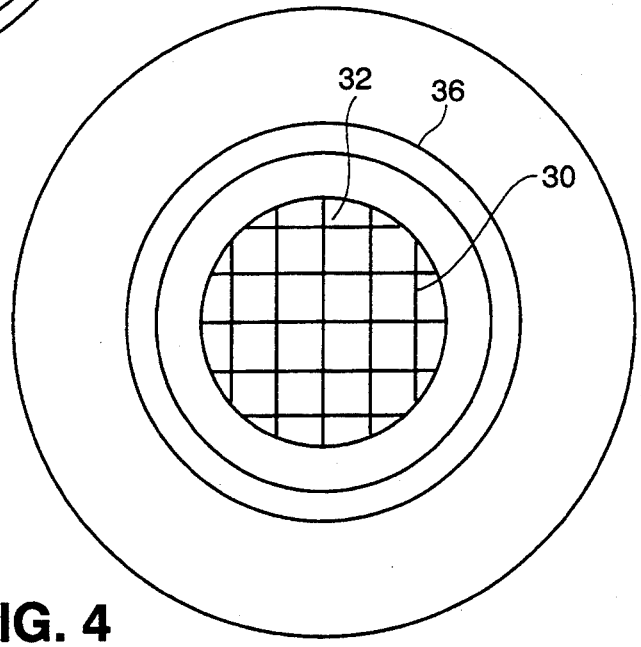
Figure 5:
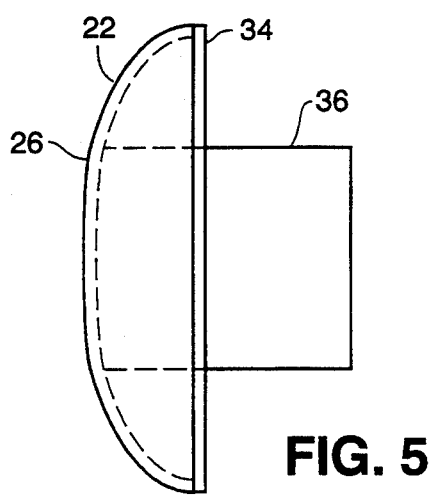
Figure 6:
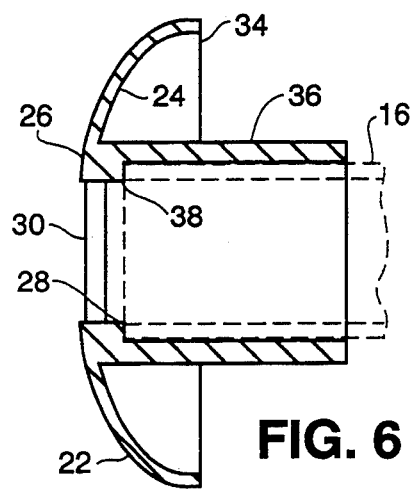
Figure 7:
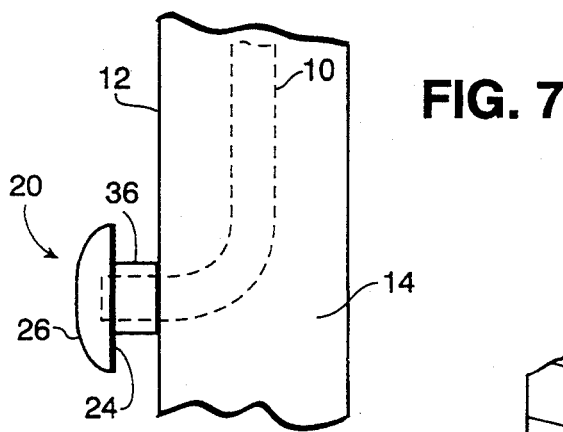
Figure 8:
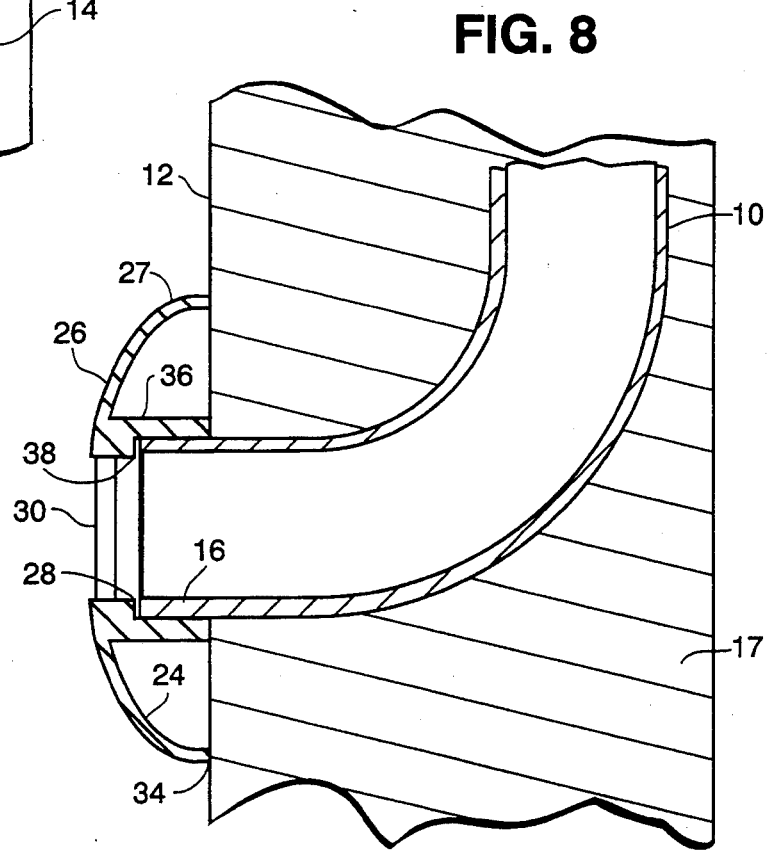

Having thus described the invention in general terms, reference will now be made to the accompanying drawings (two sheets) in which:

FIG. 1 is a vertical sectional view showing a prior art arrangement of mounting a collar over the end of a drain pipe;

FIG. 2 is a perspective view of a front surface of a protective cover constructed in accordance with and embodying the present invention;

FIG. 3 is a perspective view of a rear portion of the protective cover of FIG. 2;

FIG. 4 is a rear elevational view of the protective cover;

FIG. 5 is a side elevational view of the protective cover;

FIG. 6 is a vertical sectional view of the protective cover, somewhat similar to FIG. 5, and showing a pipe located therein in phantom view;

FIG. 7 is a fragmentary side elevational view showing the protective cover at the wall of a building having a projecting drain pipe; and FIG. 8 is an enlarged vertical sectional view showing the mounting or or the protective cover of the present invention on the end of a drain pipe.

DETAILED DESCRIPTION OF PREFERRED EMBODIMENTS

Referring now in more detail and by reference characters to the drawings, FIG. 1 illustrates a prior art arrangement of a drain pipe 10 projecting through an exterior surface 12 of a wall 14 forming part of a building structure. The drain pipe has a stub end 16 and disposed over the stub end 16 is a conventional pipe collar 18. In many cases, the stub end 16 of the drain pipe may be externally threaded in order to accommodate the conventional pipe collar 18. Otherwise, the conventional pipe collar 18 could be disposed on and secured to the stub end 16 of the drain pipe by any conventional means.

FIGS. 2 and 3 illustrate, in perspective view, a protective cover 20 which is constructed in accordance with and embodies the present invention. The protective cover 20 comprises a convexo-concave disk 22 which has an interiorly presented or rear-concave surface 24 and an exteriorly presented or convex surface 26, as best shown in FIGS. 2 and 3. The overall size of the convexo-concave disk 22 is not critical and the size is primarily predicated on the size of the particular drain pipe with which the cover will be used. Thus, in many cases, the protective cover may have an overall size of two to three inches or otherwise, for larger drain pipes, e.g., two inch OD drain pipes, the protective cover may have an overall diametral size of five to six inches, or more.

The convexo-concave disk 22 is provided with a central opening 28 which projects through the convexo-concave disk 22 from the convex surface 26 to the rear concave surface 24. Further, a grid or so-called "mesh" 30 extends across the opening so as to enclose the opening except for small spaces 32 through which water can pass. The grid or so-called "mesh" 30 is of size sufficient to preclude small animals such as rodents and for that matter insects from obtaining access through the central opening 28 to a drain pipe on which the protective cover is used. In the preferred embodiment, the grid or so-called "mesh" 30 is integral with the convexo-concave disk 22.

The convexo-concave disk 22 also has a peripheral annular edge 34 which may engage the exterior surface 12 of the wall 14 forming part of a building structure. However, it is not necessary for the peripheral annular edge 34 to engage the exterior surface 12 and in some embodiments it may be spaced from the exterior surface 12 of this wall 14.

Projecting outwardly from the rear-concave surface 24 of the convexo-concave disk 22 is a cylindrically shaped retaining or mounting flange 36. Here again, the cylindrically shaped retaining or mounting flange 36 may be integral with the convexo-concave disk 22 in a preferred embodiment. The cylindrically shaped retaining or mounting flange 36 fully surrounds the opening and projects rearwardly to at least the depth of the convexo-concave disk 22 and in most cases beyond the convexo-concave disk 22. Thus, by reference to FIGS. 2 and 3, it can be seen that the cylindrically shaped retaining or mounting flange 36 projects rearwardly of the peripheral annular edge 34.

Integral with the convexo-concave disk 22 and the cylindrically shaped retaining or mounting flange 36 is a shoulder 38 which is sized to receive an end of a drain pipe, as best illustrated in FIGS. 6 and 8 of the drawings. Thus, FIG. 6 shows a stub end 16 of a drain pipe extending into the cylindrically shaped retaining or mounting flange 36 and having an end abutted against the annular shoulder 38 as illustrated. Furthermore, the stub 16 of the drain pipe 10 is snugly fitted within the interior of the cylindrically shaped retaining or mounting flange 36, as also best illustrated in FIGS. 6 and 8 of the drawings.

It should be understood that the mounting flange could be constructed so as to extend within the open end of the drain pipe 10. However, in a preferred mode of construction, it is desired to have the mounting flange concentrically disposed about the edge of the drain pipe 10, as illustrated. This enables easier mounting of and removal of the protective cover 20 of the present invention.

The protective cover of the present invention may be conveniently molded from any of a number of suitable plastics such as polyethylene, polystyrene, polypropylene, or the like. Further, any number of plastic-forming operations such as injection molding or the like may be used. However, and while plastic is a preferred material of construction, the protective cover could be made of metals or other materials as may be desired.

The disk forming part of the protective cover can easily be provided with a color so as to conform to the building structure on which the protective cover is used. The color itself may be painted on to the exterior surface of the disk as for example, by spray painting or otherwise, it can be incorporated in the disk during molding thereof.

Thus, there has been illustrated and described a unique and novel protective and aesthetics-enhancing cover used in connection with drain pipes for effectively hiding a drain pipe from view and which also precludes access by small animals and insects. The protective cover of the present invention therefore fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. A protective and aesthetics-enhancing cover for disposition over the open end of a drain pipe projecting outwardly from a building structure and where water is to drain from the building structure outwardly through and from the open end of the drain pipe, said cover comprising:
   a) a disk extending over the open end of the drain pipe and having a size larger than the drain pipe to effectively visually obscure the drain pipe and hide the drain pipe from view;
   b) a tubular mounting flange projecting outwardly from said disk on a surface facing the drain pipe, said mounting flange sized to be coupled to the drain pipe in a telescopic arrangement and thereby retentively hold the disk over the end of the drain pipe;
   c) means forming an opening in the disk allowing water to drain through the drain pipe and outwardly through the opening; and
   d) means precluding access through the open end of the drain pipe to the interior thereof by small animals or insects; and
   e) said cover constituting a terminal end of the drain pipe and not being connected or connectable to any other component, said cover also not allowing for any further pipe extension thereto and having a size and shape to effectively hide the otherwise open end of the pipe completely from view while allowing water drainage at all times and still completely blocking access in the open end by small animals or insects.

2. The protective and aesthetics-enhancing cover for disposition over the open end of a drain pipe of claim 1 further characterized in that the means precluding access is an open grid which extends across said opening to preclude access by small animals or insects.

3. The protective and aesthetics-enhancing cover for disposition over the open end of a drain pipe of claim 1 further characterized in that said disk has an outer wall which is curved outwardly away from the building structure so that it has an inner concave surface facing the building structure.

4. The protective and aesthetics-enhancing cover for disposition over the open end of a drain pipe of claim 1 further characterized in that said tubular mounting flange is sized slightly larger than the end of the pipe to telescopically receive the pipe therein.

5. The protective and aesthetics-enhancing cover for disposition over the open end of a drain pipe of claim 4 further characterized in that a circular retaining flange extends into and surrounds the opening and has a flat shoulder which engages the end of the drain pipe, said retaining flange having a size which is approximately the same size as the open end of the drain pipe and thereby hide the end of the drain pipe from view.

6. The protective and aesthetics-enhancing cover for disposition over the end of a drain pipe of claim 5 further characterized in that said retaining flange extends generally perpendicularly with respect to the mounting flange.

7. The protective and aesthetics-enhancing cover for disposition over the end of a drain pipe of claim 5 further characterized in that said retaining flange extends at an acute angle with respect to the mounting flange.

8. A protective and aesthetics-enhancing cover for disposition over the open end of a drain pipe projecting outwardly from a building wall, and where water is to drain outwardly through the wall from the open end of the drain pipe, said cover comprising:
   a) a convexly-shaped circular plate extending over the open end of the drain pipe and having a concavely shaped surface facing the building wall from which the pipe extends, and the convexly shaped plate with a size larger than the drain pipe to thereby visually obscure and effectively hide the drain pipe from view;
   b) a cylindrically shaped tubular mounting flange extends axially outwardly from said convexly shaped plate and being sized to be telescopically coupled to the drain pipe to be retentively held over the end of the drain pipe;
   c) an opening in said plate located over the open end of the drain pipe and in communication with the drain pipe to allow drainage therethrough, said opening having a size equal to or less than the inner diameter of the drain pipe; and
   d) means precluding access through the open end of the drain pipe to the interior thereof by small animals or insects.

9. The protective and aesthetics-enhancing cover for disposition over the open end of a drain pipe of claim 8 further characterized in that the means precluding access is an open grid which extends across said opening to preclude access by small animals or insects.

10. The protective and aesthetics-enhancing cover for disposition over the open end of a drain pipe of claim 8 further characterized in that the grid is integral with the plate.

11. The protective and aesthetics-enhancing cover for disposition over the open end of a drain pipe of claim 8 further characterized in that said tubular mounting flange is sized slightly larger than the end of the drain pipe to telescopically receive the pipe therein.

12. The protective and aesthetics-enhancing cover for disposition over the open end of a drain pipe of claim 8 further characterized in that a circular retaining flange extends into and surrounds the opening and has a flat shoulder which engages the end of the drain pipe, said retaining flange having a size which is approximately the same size as the open end of the drain pipe and thereby hides the end of the drain pipe from view.

* * * * *